US010025727B2

(12) United States Patent
Rachlin et al.

(10) Patent No.: US 10,025,727 B2
(45) Date of Patent: Jul. 17, 2018

(54) RELAY MECHANISM TO FACILITATE PROCESSOR COMMUNICATION WITH INACCESSIBLE INPUT/OUTPUT (I/O) DEVICE

(71) Applicant: Honeywell International, Inc., Morris Plains, NJ (US)

(72) Inventors: Elliott Rachlin, Scottsdale, AZ (US); David L. Kirk, Phoenix, AZ (US); Ananthapadmanabha Krishnamurthy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 239 days.

(21) Appl. No.: 15/017,422

(22) Filed: Feb. 5, 2016

(65) Prior Publication Data

US 2017/0228329 A1  Aug. 10, 2017

(51) Int. Cl.
| G06F 3/06 | (2006.01) |
| G06F 12/1081 | (2016.01) |
| G06F 13/28 | (2006.01) |
| G06F 13/40 | (2006.01) |
| G06F 13/16 | (2006.01) |
| G06F 13/38 | (2006.01) |

(52) U.S. Cl.
CPC ........ G06F 12/1081 (2013.01); G06F 3/0659 (2013.01); G06F 13/28 (2013.01); G06F 13/4068 (2013.01); *G06F 13/1689* (2013.01); *G06F 13/385* (2013.01)

(58) Field of Classification Search
CPC ...... G06F 3/0659; G06F 13/28; G06F 13/385; G06F 12/1081
See application file for complete search history.

(56) References Cited

U.S. PATENT DOCUMENTS

| 4,870,614 | A | | 9/1989 | Quatse |
| 5,546,546 | A | * | 8/1996 | Bell ...................... G06F 13/362 710/100 |
| 5,613,071 | A | * | 3/1997 | Rankin ............... G06F 12/0284 |
| 5,883,939 | A | | 3/1999 | Friedman et al. |
| 6,101,563 | A | * | 8/2000 | Fields, Jr. ............. G06F 13/404 710/104 |
| 6,519,605 | B1 | | 2/2003 | Gilgen et al. |

(Continued)

FOREIGN PATENT DOCUMENTS

WO    2014/159304 A1    10/2014

OTHER PUBLICATIONS

Ananthapadmanabha Krishnamurthy, et al., "System and Method for Legacy Level 1 Controller Virtualization," U.S. Appl. No. 15/182,497, filed Jun. 14, 2016, 39 pages.

(Continued)

*Primary Examiner* — Glenn A Auve

(57) ABSTRACT

A method includes transmitting, by a first processing device, a signal to a second relay processing device. The signal includes a message for the second relay processing device to transmit a read command and/or a write command to an I/O device that is not accessible by the first processing device. The method also includes receiving, by the first processing device, an indication that the second relay processing device has transmitted the read command and/or the write command to the I/O device.

22 Claims, 4 Drawing Sheets

(56) References Cited

U.S. PATENT DOCUMENTS

| | | | |
|---|---|---|---|
| 7,505,455 B1* | 3/2009 | Goodwin | H04L 12/40052 370/356 |
| 7,565,631 B1 | 7/2009 | Banerjee et al. | |
| 7,836,328 B1* | 11/2010 | Puri | G06F 11/0793 714/2 |
| 8,504,728 B1* | 8/2013 | Williams | H04L 9/0637 709/250 |
| 9,092,023 B2 | 7/2015 | Schultz et al. | |
| 2002/0032823 A1 | 3/2002 | Scardamalia et al. | |
| 2005/0278468 A1* | 12/2005 | Freimark | G06F 13/409 710/301 |
| 2006/0236001 A1* | 10/2006 | Tanabe | G06F 13/28 710/22 |
| 2008/0282342 A1* | 11/2008 | Hatakeyama | G06F 12/1491 726/17 |
| 2009/0216921 A1 | 8/2009 | Saito et al. | |
| 2010/0262741 A1 | 10/2010 | Hayakawa et al. | |
| 2014/0233453 A1 | 8/2014 | Speight et al. | |
| 2016/0170921 A1* | 6/2016 | Okuda | G06F 13/28 714/768 |

OTHER PUBLICATIONS

Elliott Rachlin, et al. "System and Method for Facilitating Dynamic Remapping of Absolute Addresses during Software Migration," U.S. Appl. No. 15/176,108, filed Jun. 7, 2016, 31 pages.

Elliott Rachlin, "Apparatus and Method for Managing a Plurality of Threads in an Operating System," U.S. Appl. No. 14/622,465, filed Feb. 13, 2015, 32 pages.

Elliott Rachlin, "System and Method for Endian Correction of Complex Data Structures in Heterogeneous Systems", U.S. Appl. No. 14/604,346, filed Jan. 23, 2015, 48 pages.

Elliott Rachlin, et al., "System and Method for Data Compatibility Across Heterogeneous Machine Architectures", U.S. Appl. No. 15/164,724, filed May 25, 2016, 27 pages.

Elliott Rachlin, et al., "Relay Mechanism to Facilitate Processor Communication with Inaccessible Input/Output (I/0) Device", U.S. Appl. No. 15/017,422, filed Feb. 5, 2016, 37 pages.

Elliott Rachlin, System and Method for Preserving Value and Extending Life of Legacy Software in Face of Processor Unavailability, Rising Processor Costs, or other Issues, U.S. Appl. No. 15/017,467, filed Feb. 5, 2016, 35 pages.

Elliott Rachlin, "System and Method for Capturing and Displaying Packets and Other Messages in Local Control Network (LCN)", U.S. Appl. No. 15/009,544, filed Jan. 28, 2016, 2016, 24 pages.

Elliott Rachlin, et al., "Replication of Memory Image for Efficient Simultaneous Uses," U.S. Appl. No. 15/045,947, filed Feb. 17, 2016, 28 pages.

"Packet analyzer," Wikipedia, Jan. 14, 2016, 4 pages.

Notification of Transmittal of the International Search Report and The Written Opinion of the International Searching Authority, or the Declaration dated Apr. 17, 2017 in connection with International Patent Application No. PCT/US2017/013696.

* cited by examiner

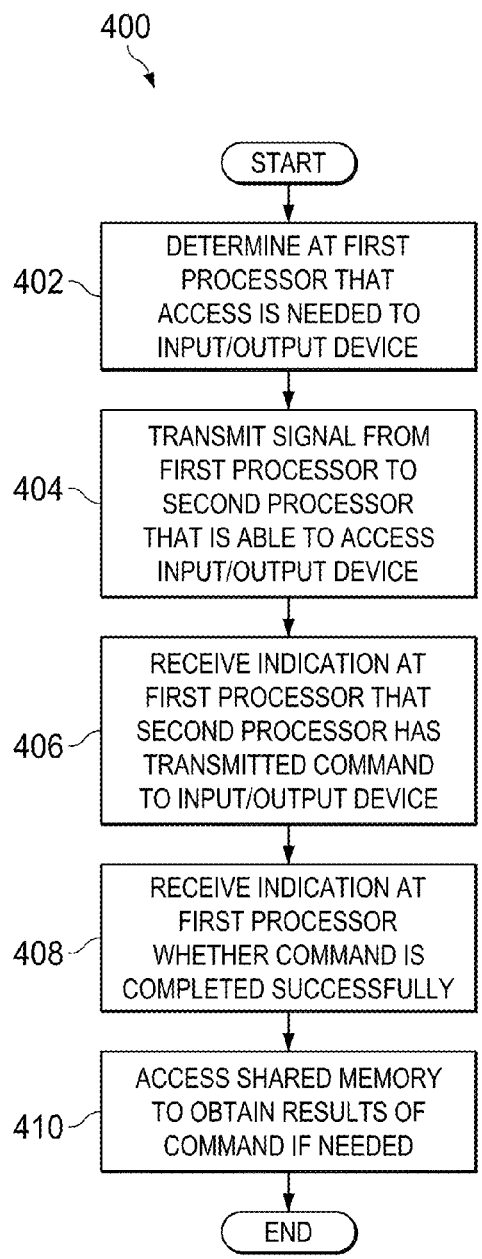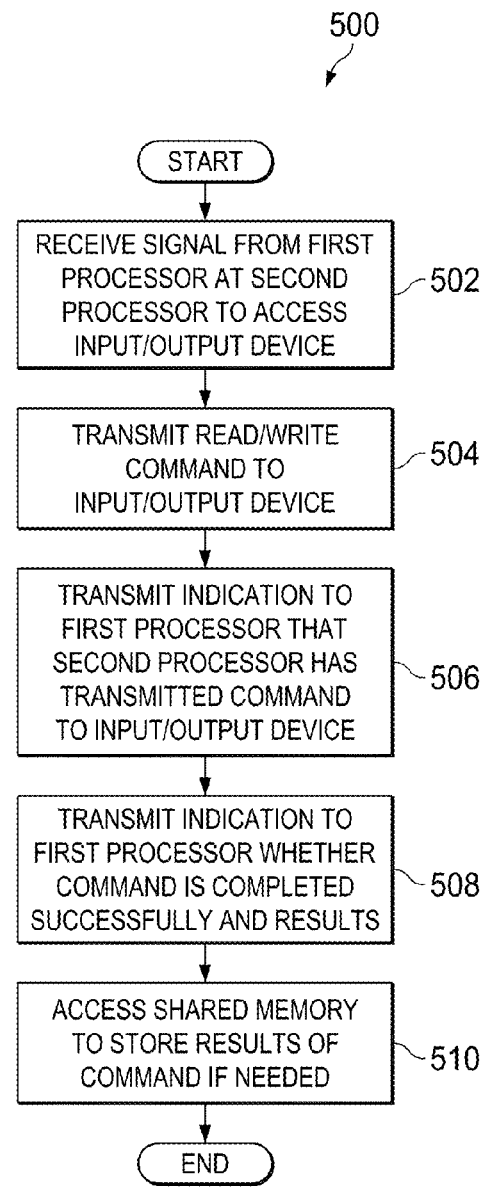
FIG. 4
FIG. 5

RELAY MECHANISM TO FACILITATE PROCESSOR COMMUNICATION WITH INACCESSIBLE INPUT/OUTPUT (I/O) DEVICE

TECHNICAL FIELD

This disclosure is generally directed to computing devices. More specifically, this disclosure is directed to a relay mechanism to facilitate processor communication with an inaccessible input/output (I/O) device.

BACKGROUND

Computing devices routinely need to communicate with input/output (I/O) devices in an industrial process control and automation system. However, some computing devices in an industrial process control and automation system may not be able to communicate with various I/O devices, such as when older I/O devices are not electrically or logically accessible by newer computing devices. As a particular example, there may be a need in some circumstances for a particular computing device to interact with a specific I/O device, but the computing device may not be able to access the I/O device because of board design issues or other problems.

SUMMARY

This disclosure relates to a relay mechanism to facilitate processor communication with an inaccessible input/output (I/O) device.

In a first embodiment, a method includes transmitting, by a first processing device, a signal to a second relay processing device. The signal includes a message for the second relay processing device to transmit a read command and/or a write command to an I/O device that is not accessible by the first processing device. The method also includes receiving, by the first processing device, an indication that the second relay processing device has transmitted the read command and/or the write command to the I/O device.

In a second embodiment, an apparatus includes a first processing device configured to transmit a signal to a second relay processing device. The signal includes a message for the second relay processing device to transmit a read command and/or a write command to an I/O device that is not accessible by the first processing device. The first processing device is also configured to receive an indication that the second relay processing device has transmitted the read command and/or the write command to the I/O device.

In a third embodiment, a method includes receiving a signal from a first processing device at a second relay processing device. The signal includes a message for the second relay processing device to transmit a read command and/or a write command to an I/O device that is not accessible by the first processing device. The method also includes transmitting, from the second relay processing device, the read command and/or the write command to the I/O device. The method further includes transmitting, to the first processing device, an indication that the second relay processing device has transmitted the read command and/or the write command to the I/O device.

In a fourth embodiment, an apparatus for use with a first processing device includes a second relay processing device configured to receive a signal from the first processing device. The signal includes a message for the second relay processing device to transmit a read command and/or a write command to an I/O device that is not accessible by the first processing device. The second relay processing device is also configured to transmit the read command and/or the write command to the I/O device. The second relay processing device is further configured to transmit, to the first processing device, an indication that the second relay processing device has transmitted the read command and/or the write command to the I/O device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4 and 5 illustrate example methods for facilitating processor communication with an inaccessible I/O device according to this disclosure.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
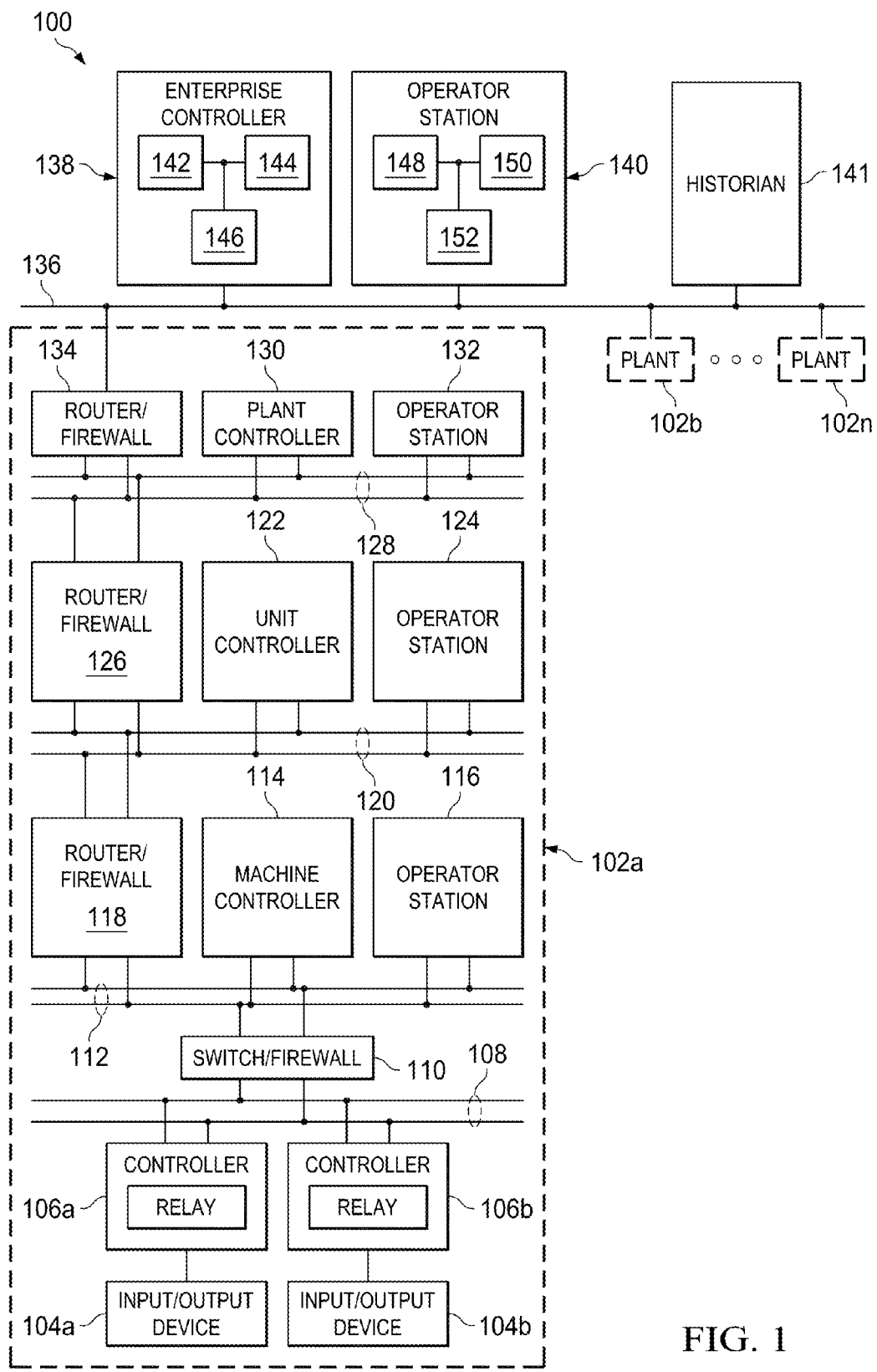
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 102a-102n. Each plant 102a-102n represents one or more processing facilities (or one or more portions thereof), such as one or more manufacturing facilities for producing at least one product or other material. In general, each plant 102a-102n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more input/output (I/O) devices 104a-104b. The I/O devices 104a-104b represent components in a process system that may perform any of a wide variety of functions. The I/O devices 104a-104b can include sensors, actuators, or the like. Sensors can measure a wide variety of characteristics in the process system, such as temperature, pressure, or flow rate. Actuators can alter a wide variety of characteristics in the process system. Sensors include any suitable structure for measuring one or more characteristics in a process system. Actuators include any suitable structure for operating on or affecting one or more conditions in a process system. The I/O devices 104a-104b could represent any other or additional components in any suitable process system.

In the Purdue model, "Level 1" may include at least two controllers 106a-106b. Among other things, each controller 106a-106b may use the measurements from one or more I/O devices (such as one or more sensors) to control the operation of one or more other I/O devices (such as one or more actuators). Each controller 106a-106b includes any suitable structure for interacting with one or more I/O devices 104a-104b. Each controller 106a-106b could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106a-106b could represent a computing device running a real-time operating system.

Two networks 108 are coupled to the controllers 106a-106b. The networks 108 facilitate interaction with the controllers 106a-106b, such as by transporting data to and from the controllers 106a and 106a. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106a-106b and I/O devices 104a-104b, which could be associated with a particular piece of industrial equipment (such as a boiler or other machine). For example, the machine-level controllers 114 could log information collected or generated by the controllers 106a-106b, such as measurement data from the sensors or control signals for the actuators. The machine-level controllers 114 could also execute applications that control the operation of the controllers 106a-106b, thereby controlling the operation of the I/O devices 104a-104b. In addition, the machine-level controllers 114 could provide edge access to the controllers 106a-106b. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106a-106b as well as I/O devices 104a-104b).

One or more operator stations 116 are coupled to the networks 112. The operator stations 116 represent computing or communication devices providing user access to the machine-level controllers 114, which could then provide user access to the controllers 106a-106b (and possibly the I/O devices 104a-104b). As particular examples, the operator stations 116 could allow users to review the operational history of the I/O devices 104a-104b using information collected by the controllers 106a-106b and/or the machine-level controllers 114. The operator stations 116 could also allow the users to adjust the operation of the I/O devices 104a-104b, controllers 106a-106b, or machine-level controllers 114. In addition, the operator stations 116 could receive and display warnings, alerts, or other messages or displays generated by the controllers 106a-106b or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106a-106b, and I/O devices 104a-104b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 102a-102n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 102a-102n and to control various aspects of the plants 102a-102n. The enterprise-level controllers 138 can also perform various functions to support the operation and control of components in the plants 102a-102n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 102a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106a, 106b, 114, 122, 130, and 138 could include one or more processing devices 142 and one or more memories 144 for storing instructions and data used, generated, or collected by the processing device(s) 142. Each of the controllers 106a, 106b, 114, 122, 130, and 138 could also include at least one network interface 146, such as one or more Ethernet interfaces or wireless transceivers. Also, each of the operator stations 116, 124, 132, and 140 could include one or more processing devices 148 and one or more memories 150 for storing instructions and data used, generated, or collected by the processing device(s) 148. Each of the operator stations 116, 124, 132, and 140 could also include at least one network interface 152, such as one or more Ethernet interfaces or wireless transceivers.

As noted above, there may be some instances where a specific computing device in the industrial process control and automation system 100 cannot interact directly with a particular I/O device. As examples, the controller 106a may not be able to communicate directly with the I/O device 104a, or the controller 106b may not be able to communicate directly with the I/O device 104b. This can arise for any number of reasons, such as the design of the controller(s) or I/O device(s).

In accordance with this disclosure, a controller or other computing device can be supplied with at least one relay processor, which can be placed in communication with at least one primary processor of the computing device. The relay processor can also be placed in communication with an I/O device that is otherwise electrically or logically inaccessible to the primary processor. As particular examples, the controller 106a could include a relay processor facilitating communication with the I/O device 104a, or the controller 106b could include a relay processor facilitating communication with the I/O device 104b. As a result, the controller 106a is able to interact with the I/O device 104a, or the controller 106b is able to interact with the I/O device 104b.

In some embodiments, the primary and relay processors support a communication protocol that is used to share data between the processors. For example, the relay processor can be configured to write data to and read data from an I/O device. When the primary processor needs access to the I/O device, the primary processor can transmit a signal to the relay processor directing the relay processor to transmit a command (such as a read or write command) to the I/O device. This enables the primary processor to utilize the relay processor as a proxy to write data to or receive data from the I/O device, even though the primary processor is not able to electrically or logically access the I/O device.

The specific interactions between the primary and relay processors can vary depending on the functions being supported in the system 100. For example, when an I/O device represents a sensor, the primary processor could use the relay processor as a proxy to obtain measurement data from the sensor. When an I/O device represents an actuator, the primary processor could use the relay processor as a proxy to provide control data to the actuator. Any other suitable interacts and data transfers could be supported between processors to support a relay with an I/O device.

There are various approaches to supporting communication between the primary and relay processors. For example, a shared memory that is accessible by both processors could be provided, and the shared memory could reside within or be external to the computing device. Any suitable mechanism could also be used to help reduce or prevent simultaneous access to the same memory location by both processors.

The communication protocol used by the processors can define whether a read or write operation is to be performed. In the case of a write operation, the communication protocol can define the data to be written. In the case of a read operation, the communication protocol can provide newly-read data in an agreed-upon memory location. Such a communication protocol can also provide a "return status," which indicates whether a request is still in progress or if the request has completed. The return status may also indicate the success or failure of the operation. The relay processor, in its role as proxy, can periodically or continuously examine a shared memory area for any new requests. The primary processor can monitor the shared memory area in order to determine when new requests can be made or to determine when an existing request has completed.

A particular example of this functionality involves the addition of a circuit card to a controller 106a or 106b. The circuit card can contain both an unused processor and a gate array. The gate array can contain logic to drive an I/O path onto a communications network. For instance, the circuit card could denote an LCNP4E circuit card from HONEYWELL INTERNATIONAL INC., which is ordinarily used to provide a network path to a Local Control Network (LCN) in an industrial process control and automation system. This circuit card could include a processor (such as a MOTOROLA 68040 processor) that is not needed for normal communications over the LCN. The card is placed into the controller in order to give the card access to the communication medium used by the controller. However, the primary processor of the controller may be unable to access the gate array, such as due to the absence of any direct path to the gate array's memory. The unused processor on the circuit card of the controller could therefore be used as a relay processor. Here, the primary processor of the controller requests that the otherwise unused processor act as a relay, performing its desired I/O operations in the gate array as a proxy for the primary processor. After the desired operations are completed, the proxy informs the primary processor of the results, including any data that was newly read.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which a relay mechanism to facilitate processor communication with an inaccessible I/O device can be used. This functionality can be used in any other suitable system.

Figure 2:
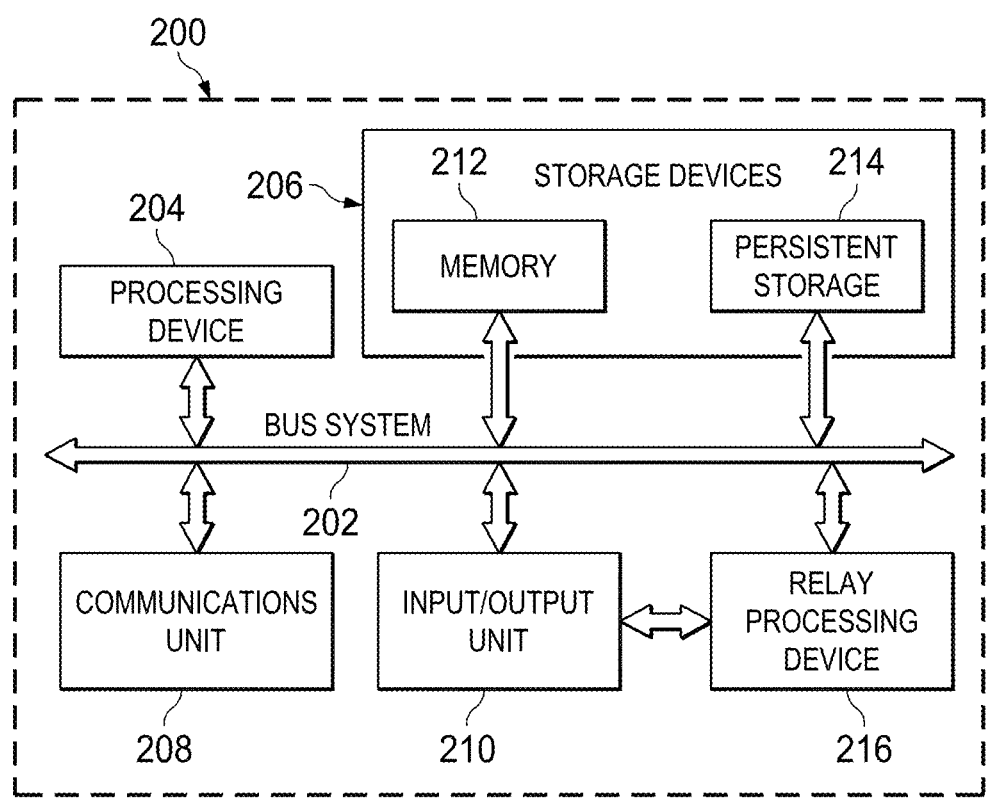
FIG. 2 illustrates an example computing device facilitating processor communication with an inaccessible input/output (I/O) device according to this disclosure.

FIG. 2 illustrates an example computing device 200 facilitating processor communication with an inaccessible I/O device according to this disclosure. The computing device 200 shown in FIG. 2 could, for example, denote either of the controllers 106a-106b shown in FIG. 1 and described above. Note, however, that the controllers 106a-106b could be implemented in any other suitable manner.

As shown in FIG. 2, the computing device 200 includes a bus system 202, which supports communication between at least one processing device 204, at least one storage device 206, at least one communications unit 208, and at least one I/O unit 210.

The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discreet circuitry. Using the terminology above, the processing device 204 could be said to represent the "primary" processor of the device 200.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card or a wireless transceiver facilitating communications over a network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device. In addition, the I/O unit 210 can support communications and interactions with I/O devices, such as one or more I/O devices 104a or 104b.

As noted above, at least one relay processing device 216 can be used to support communications between the processing device 204 and at least one I/O device that is otherwise inaccessible to the processing device 204. In particular, the relay processing device 216 can access the I/O device and function as a relay to provide information to or receive information from the processing device 204. For example, at least one relay processing device 216 and at least one I/O unit 210 could reside on a circuit card that can be coupled to the device 200. The processing devices 204 and 216 can be configured to support a communication protocol that is used to share data between the processing devices. For instance, the communication protocol may allow the processing device 204 to request that the relay processing device 216 perform a read or write operation involving an I/O device, where the processing device 204 lacks access to the I/O device. The communication protocol may also allow the relay processing device 216 to return information about the requested operation, such as an acknowledgement of a successful write operation or newly-read data for a successful read operation. Depending on whether a shared memory is used, the processing devices 204 and 216 may also support access to and use of the shared memory, such as within the memory 212 or persistent storage 214.

Although FIG. 2 illustrates one example of a computing device 200 facilitating processor communication with an inaccessible I/O device, various changes may be made to FIG. 2. For example, computing devices can come in a wide variety of configurations. The computing device shown in FIG. 2 is meant to illustrate one example implementation and does not limit this disclosure to a particular type of computing device.

Figure 3:
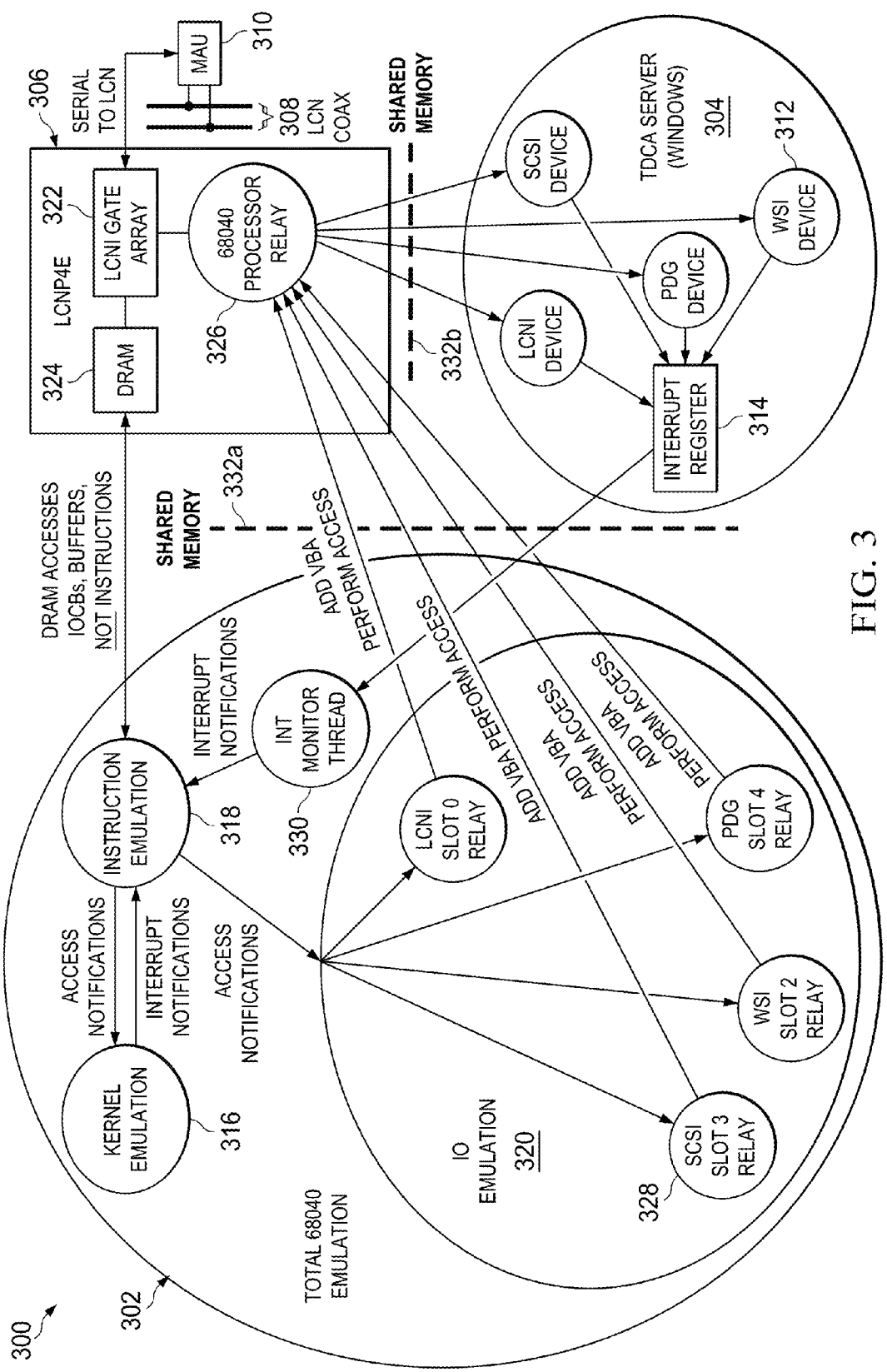
FIG. 3 illustrates a specific example of a computing device facilitating processor communication with an inaccessible I/O device according to this disclosure.

FIG. 3 illustrates a specific example of a computing device 300 facilitating processor communication with an inaccessible I/O device according to this disclosure. As shown in FIG. 3, this specific example of the computing device 300 includes an emulation architecture 302 running in conjunction with computing hardware 304. The computing device 300 also includes an interface card 306, which facilitates access to an LCN 308 via a media access unit (MAU) 310. The computing hardware 304 here includes various device interfaces 312, such as a small computer system interface (SCSI), a HONEYWELL PDG video interface, an LCN interface (LCNI), and a work station interface (WSI). The computing hardware 304 also includes at least one register 314 used to store information associated with interrupts generated by the computing hardware 304. Note, however, that the computing hardware 304 could include any other or additional interfaces or memories.

The emulation architecture 302 includes an emulation framework that is used to emulate a specific type of processor (a 68040 processor in this example) on another type of processor (such as an INTEL x86 processor). The framework includes a kernel emulator 316, an instruction emulator 318, and an I/O emulator 320. As the names imply, the kernel emulator 316 is used to emulate so-called kernel functions (compute functions not typically performed by a main processor, examples of which are named below). Also, the instruction emulator 318 is used to emulate the execution of instructions on a processor, and the I/O emulator 320 is used to emulate input and output operations on a processor. The kernel emulator 316 could include various types of emulations depending on the specific kernel being emulated. For example, the kernel emulator 316 could include a universal asynchronous receiver/transmitter (UART) emulator and a clock emulator for the 68040 processor. The instruction emulator 318 is used to implement various instructions that are not executed within the kernel emulator 316. For instance, the instruction emulator 318 can be used to execute various instructions in legacy source code in order to emulate the execution of the legacy source code on the 68040 processor. In some embodiments, the instruction emulator 318 could denote an instruction emulator from MICROAPL LTD.

The interface card 306 in this example includes a gate array 322 and a memory 324. The gate array 322 functions to provide physical connection to an external network, in this case an LCN. The memory 324 is used to store data flowing through the interface card 306. The gate array 322 includes any suitable circuitry providing connection to an external network. The memory 324 includes any suitable structure for storing and facilitating retrieval of information, such as a dynamic random access memory (DRAM). The interface card 306 also includes a relay processor 326, which as described above functions as a relay between a primary processor (which is executing the emulation architecture 302) and the interfaces 312. In this particular example, the relay processor 326 provides access to I/O devices via the four interfaces 312 described above (LCNI, SCSI, PDG, and WSI), although the relay processor 326 could provide access to any suitable I/O devices via any suitable interfaces.

In this example, the I/O emulator 320 includes multiple relays 328 that function to direct communications to and from the interfaces 312 via the relay processor 326. Each type of interface 312 can have its own relay 328 so that programs executing as part of the emulation architecture 302 can access the interfaces 312 via the relays 328 without any knowledge that the interfaces 312 may actually be inaccessible through normal communications.

The emulators 316-320 communicate and exchange access notifications and interrupt notifications. An access notification is used to indicate that one emulator needs to access data or other information associated with another emulator. An interrupt notification is used by one emulator to inform another emulator that an interrupt has occurred so that the other emulator can take suitable action in response to the interrupt. An interrupt monitoring thread 330 is used here to scan for interrupts from the computing hardware 304 and to provide additional interrupt notifications to the emulator 318.

One or more shared memories 332a-332b can be used to support the transport of data between various components of the computing device 300 in FIG. 3. Each shared memory 332a-332b denotes any suitable structure capable of storing data. While shown as separate memories here, the shared memories 332a-332b could denote different portions of a single memory device.

Although FIG. 3 illustrates one specific example of a computing device 300 facilitating processor communication with an inaccessible I/O device, various changes may be made to FIG. 3. For example, various components in FIG. 3 could be combined, further subdivided, or omitted and additional components could be added according to particular needs. Also, while FIG. 3 illustrates one specific emulation involving an 68040 processor, any other suitable emulations involving different processors could also be supported.

FIGS. 4 and 5 illustrate example methods for facilitating processor communication with an inaccessible I/O device according to this disclosure. In particular, FIG. 4 illustrates an example method 400 used by a first processor (a primary processor) attempting to access an I/O device that is directly inaccessible by the first processor, and FIG. 5 illustrates an example method 500 used by a second processor (a relay processor) acting as a proxy for the first processor. For ease of explanation, the methods 400 and 500 are described with respect to one of the controllers 106a-106b operating in the system 100 of FIG. 1, although the methods could be used with any other suitable devices and in any other suitable systems.

As shown in FIG. 4, a determination is made at a first processor that access to an I/O device is needed or desired at step 402. This could include, for example, the processing device 204 of the controller 106a or 106b determining that read or write access to the I/O device 104a or 104b is needed, such as to execute control logic of the controller 106a or 106b.

The identified I/O device may not be electrically or logically accessible by the first processor. In that case, the first processor transmits a signal to a second processor that is able to access the I/O device at step 404. This could include, for example, the processing device 204 in the controller 106a or 106b transmitting a signal to the relay processing device 216 that has access to the I/O device 104a or 104b. The first processor could identify the second processor as the proxy for the I/O device in any suitable manner, such as by using a table or other information stored at the first processor. The signal sent to the second processor could have any suitable contents depending on, for instance, whether the desired command is a read or write command.

An indication is received at the first processor that the second processor has transmitted a command to the I/O device at step 406. This could include, for example, the processing device 204 receiving a return status indicating that a read or write command has been transmitted from the relay processing device 216 to the I/O device 104a or 104b. An indication is received at the first processor whether the command was successfully completed at step 408. This could include, for example, the processing device 204 receiving a return status indicating whether the read or write command was successfully performed using the I/O device 104a or 104b. If needed, a shared memory is accessed to obtain results of the command at step 410. This could include, for example, the processing device 204 accessing a shared memory location to obtain data read from the I/O device 104a or 104b. Note that the return status indicators could also be received via the shared memory.

At this point, the first processor can perform any desired function. For example, the first processor could use the obtained data to execute control logic. The first processor could also use the data to identify another I/O device to be accessed, either directly or indirectly via the same proxy processor or a different proxy processor.

As shown in FIG. 5, a second processor receives a signal from a first processor at step 502. This could include, for example, the relay processing device 216 receiving a signal from the processing device 204, where the relay processing device 216 has access to an I/O device 104a or 104b that the processing device 204 wishes to access. In response, the second processor transmits a command to the I/O device on behalf of the first processor at step 504. This could include, for example, the relay processing device 216 constructing a read or write command for the I/O device 104a or 104b based on the signal received from the processing device 204.

An indication is transmitted to the first processor that the second processor has transmitted a command to the I/O device at step 506. This could include, for example, the relay processing device 216 providing a return status indicating that a read or write command has been transmitted from the relay processing device 216 to the I/O device 104a or 104b. An indication is transmitted to the first processor whether the command was successfully completed at step 508. This could include, for example, the relay processing device 216 providing a return status indicating whether the read or write command was successfully performed using the I/O device 104a or 104b. If needed, a shared memory is accessed to store results of the command at step 510. This could include, for example, the relay processing device 216 accessing a shared memory location to store data read from the I/O device 104a or 104b. Note that the return status indicators could also be provided via the shared memory.

Although FIGS. 4 and 5 illustrate examples of methods 400 and 500 for facilitating processor communication with an inaccessible I/O device, various changes may be made to FIGS. 4 and 5. For example, while shown as a series of steps, various steps shown in each figure could overlap, occur in parallel, occur in a different order, or occur multiple times. Moreover, some steps could be combined or removed and additional steps could be added according to particular needs.

Note that in the above description, the use of a relay processor is often described as providing access to an I/O device for a primary processor, where the primary and relay processors are associated with the same computing device (such as the same controller 106a or 106b). However, this need not be the case, and in other instances the primary and relay processors could form parts of different devices. For example, the primary processor in one controller 106a could communicate with the relay processor in another controller 106b to interact with the I/O device 104b, or the primary processor in one controller 106b could communicate with the relay processor in another controller 106a to interact with the I/O device 104a. Suitable inter-device communications could be supported to allow processors in different devices to interact in this manner.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system,"

"processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising;
transmitting, by a first processing device, a signal to a second relay processing device, the signal including a message for the second relay processing device to transmit a read command to an input/output (I/O) device that is not accessible by the first processing device;
receiving, by the first processing device, an indication that the second relay processing device has transmitted the read command to the I/O device; and
accessing, using the first processing device, a memory to obtain results of the read command, wherein the memory comprises a memory that is shared with the second relay processing device.

2. The method of claim 1, further comprising:
receiving, by the first processing device, a second indication that the read command has been successfully executed using the I/O device.

3. The method of claim 1, further comprising:
transmitting, by the first processing device, a second signal to the second relay processing device, the second signal including a second message for the second relay processing device to transmit a write command to the I/O device; and
receiving, by the first processing device, a second indication that the second relay processing device has transmitted the write command to the I/O device.

4. The method of claim 1, further comprising:
determining at the first processing device that access to the I/O device is needed; and
identifying the second relay processing device as a relay for communicating with the I/O device.

5. The method of claim 1, further comprising:
installing a circuit card in a computing device, the computing device comprising the first processing device, the circuit card comprising the second relay processing device and circuitry configured to communicate over a network.

6. An apparatus comprising:
a first processing device configured to transmit a signal to a second relay processing device, the signal including a message for the second relay processing device to transmit at least one of a read command and a write command to an input/output (I/O) device that is not accessible by the first processing device;
wherein the first processing device is also configured to receive an indication that the second relay processing device has transmitted at least one of the read command and the write command to the I/O device; and
wherein the first processing device comprises a processing device of a computing device, the computing device configured to be coupled to a circuit card comprising the second relay processing device and circuitry configured to communicate over a network.

7. The apparatus of claim 6, wherein the first processing device is further configured to receive a second indication that at least one of the read command and the write command has been successfully executed using the I/O device.

8. The apparatus of claim 6, wherein:
the first processing device is further configured to access a memory to obtain results of the read command; and
the memory comprises a memory that is shared with the second relay processing device.

9. The apparatus of claim 6, wherein the first processing device is further configured to:
determine that access to the I/O device is needed; and
identify the second relay processing device as a relay for communicating with the I/O device.

10. The apparatus of claim 6, wherein:
the first processing device is further configured to execute an emulation framework, the emulation framework configured to emulate a specified type of processor that matches a type of the second relay processing device and not a type of the first processing device; and
the emulation framework comprises multiple emulators including a kernel emulator, an instruction emulator, and an I/O emulator.

11. The apparatus of claim 10, wherein the I/O emulator comprises multiple relays configured to communicate with multiple interfaces of the computing device via the second relay processing device.

12. The apparatus of claim 10, wherein:
the emulators are configured to exchange access notifications and interrupt notifications;
each access notification indicates that one of the emulators needs to access information associated with another of the emulators;
each interrupt notification is used by one of the emulators to inform another of the emulators that an interrupt has occurred; and
the emulation framework further comprises an interrupt monitoring thread configured to detect interrupts from hardware of the computing device and to provide additional interrupt notifications to the instruction emulator.

13. A method comprising:
receiving a signal from a first processing device at a second relay processing device, the signal including a message for the second relay processing device to transmit a read command to an input/output (I/O) device that is not accessible by the first processing device;
transmitting, from the second relay processing device, the read command to the I/O device;
transmitting, to the first processing, device, an indication that the second relay processing device has transmitted the read command to the I/O device; and
accessing, using the second relay processing device, a memory to store results of the read command, wherein the memory comprises a memory that is shared with the first processing device.

14. The method of claim 13, further comprising:
transmitting, to the first processing device, a second indication that the read command has been successfully executed using the I/O device.

15. The method of claim 13, further comprising:
receiving a second signal from the first processing device at the second relay processing device, the second signal including a second message for the second relay processing device to transmit a write command to the I/O device;

transmitting, from the second relay processing device, the write command to the I/O device; and transmitting, to the first processing device, a second indication that the second relay processing device has transmitted the write command to the I/O device.

16. The method of claim 13, further comprising:
installing a circuit card in a computing device, the computing device comprising the first processing device, the circuit card comprising the second relay processing device and circuitry configured to communicate over a network.

17. The method of claim 16, wherein the circuitry of the circuit card is configured to provide a Local Control Network (LCN) interface.

18. An apparatus for use with a first processing device, the apparatus comprising:
a second relay processing device configured to receive a signal from the first processing device, the signal including a message for the second relay processing device to transmit at least one of a read command and a write command to an input/output (I/O) device that is not accessible by the first processing device;
wherein the second relay processing device is also configured to transmit at least one of the read command and the write command to the I/O device;
wherein the second relay processing device is further configured to transmit, to the first processing device, an indication that the second relay processing device has transmitted at least one of the read command and the write command to the I/O device; and wherein a circuit card, comprises the second relay processing device and circuitry configured to communicate over a network, the circuit card configured to be installed in a computing device comprising the first processing device.

19. The apparatus of claim 18, wherein the second relay processing device is further configured to transmit, to the first processing device, a second indication that at least one of the read command and the write command has been successfully executed using the I/O device.

20. The apparatus of claim 18, wherein:
the second relay processing device is further configured to access a memory to store results of the read command; and
the memory comprises a memory that is shared with the first processing device.

21. The apparatus of claim 18, wherein the circuitry of the circuit card is configured to provide a Local Control Network (LCN) interface.

22. The apparatus of claim 18, wherein:
the second relay processing device is configured to communicate with an emulation framework executed by the first processing device, the emulation framework configured to emulate a specified type of processor that matches a type of the second relay processing device and not a type of the first processing device;
the emulation framework comprises multiple emulators including a kernel emulator, an instruction emulator, and an I/O emulator; and
the second relay processing device is configured to communicate with multiple relays of the I/O emulator and multiple interfaces of the computing device.

* * * * *